US010041853B2

(12) United States Patent
Stewart

(10) Patent No.: US 10,041,853 B2
(45) Date of Patent: Aug. 7, 2018

(54) LEAK DETECTION METHOD

(71) Applicant: Alpha Leak Detection Services, Inc., Kemah, TX (US)

(72) Inventor: Trent Lecon Stewart, Laurel, MS (US)

( * ) Notice: Subject to any disclaimer, the term of this patent is extended or adjusted under 35 U.S.C. 154(b) by 0 days.

(21) Appl. No.: 15/887,291

(22) Filed: Feb. 2, 2018

(65) Prior Publication Data
US 2018/0156687 A1 Jun. 7, 2018

Related U.S. Application Data

(63) Continuation of application No. 15/181,879, filed on Jun. 14, 2016, now Pat. No. 9,909,948.

(60) Provisional application No. 62/199,557, filed on Jul. 31, 2015.

(51) Int. Cl.
*E21B 47/10* (2012.01)
*G01M 3/22* (2006.01)

(52) U.S. Cl.
CPC ......... *G01M 3/222* (2013.01); *E21B 47/1015* (2013.01); *E21B 47/1025* (2013.01)

(58) Field of Classification Search
CPC ............ E21B 47/1015; E21B 47/1025; G01M 3/2853; G01M 3/223; G01M 3/2861
See application file for complete search history.

(56) References Cited

U.S. PATENT DOCUMENTS

| | | | | |
|---|---|---|---|---|
| 2,731,827 A | * | 1/1956 | Loomis | E21B 47/1025 73/152.01 |
| 3,165,920 A | * | 1/1965 | Loomis | E21B 47/1025 73/40.5 R |
| 3,478,577 A | * | 11/1969 | Hauk | G01M 3/2853 166/250.08 |
| 3,503,249 A | * | 3/1970 | Dumond | E21B 33/124 166/191 |
| 3,871,209 A | * | 3/1975 | Hasha | G01M 3/2861 73/46 |
| 4,046,006 A | * | 9/1977 | Dufrene | E21B 47/1025 73/152.51 |
| 4,429,566 A | * | 2/1984 | Armell | G01M 3/223 73/40.7 |
| 4,581,919 A | * | 4/1986 | Sullivan | G01M 3/2853 73/40.5 R |
| 5,209,105 A | * | 5/1993 | Hasha | G01M 3/223 73/46 |

(Continued)

*Primary Examiner* — David A Rogers
(74) *Attorney, Agent, or Firm* — Buskop Law Group, P.C.; Wendy Buskop

(57) ABSTRACT

A leak detection method tests a tubing collar of wellbore tubing. The leak detection method can include the steps of introducing tracer gas under pressure to a tubing collar, introducing water to the tubing collar, detecting the tracer gas from a sample obtained outside the tubing collar, controlling a water system, a gas system, and the gas analysis system, flowing the tracer gas under pressure to the tubing collar and then the water to the tubing collar sequentially and allow the sample to flow to a gas analyzer, initially pressurizing the tubing collar with the tracer gas to a first pressure, pressurized the tracer gas to a second pressure, obtaining the sample from outside the tubing collar, and analyzing the sample for the tracer gas by the gas analyzer, and providing an alert that indicates a leak is present in the tubing collar.

9 Claims, 4 Drawing Sheets

(56) References Cited

U.S. PATENT DOCUMENTS

| | | | | |
|---|---|---|---|---|
| 5,255,559 | A * | 10/1993 | Jansch | G01M 3/223 |
| | | | | 73/46 |
| 6,026,675 | A * | 2/2000 | Jansch | G01M 3/223 |
| | | | | 73/49.1 |
| 9,366,123 | B2 * | 6/2016 | Fehr | E21B 33/124 |
| 2006/0054803 | A1 * | 3/2006 | Labous | G01V 5/107 |
| | | | | 250/269.3 |
| 2006/0220650 | A1 * | 10/2006 | Lovell | E21B 17/003 |
| | | | | 324/357 |
| 2008/0029307 | A1 * | 2/2008 | Green | E21B 4/14 |
| | | | | 175/296 |

\* cited by examiner

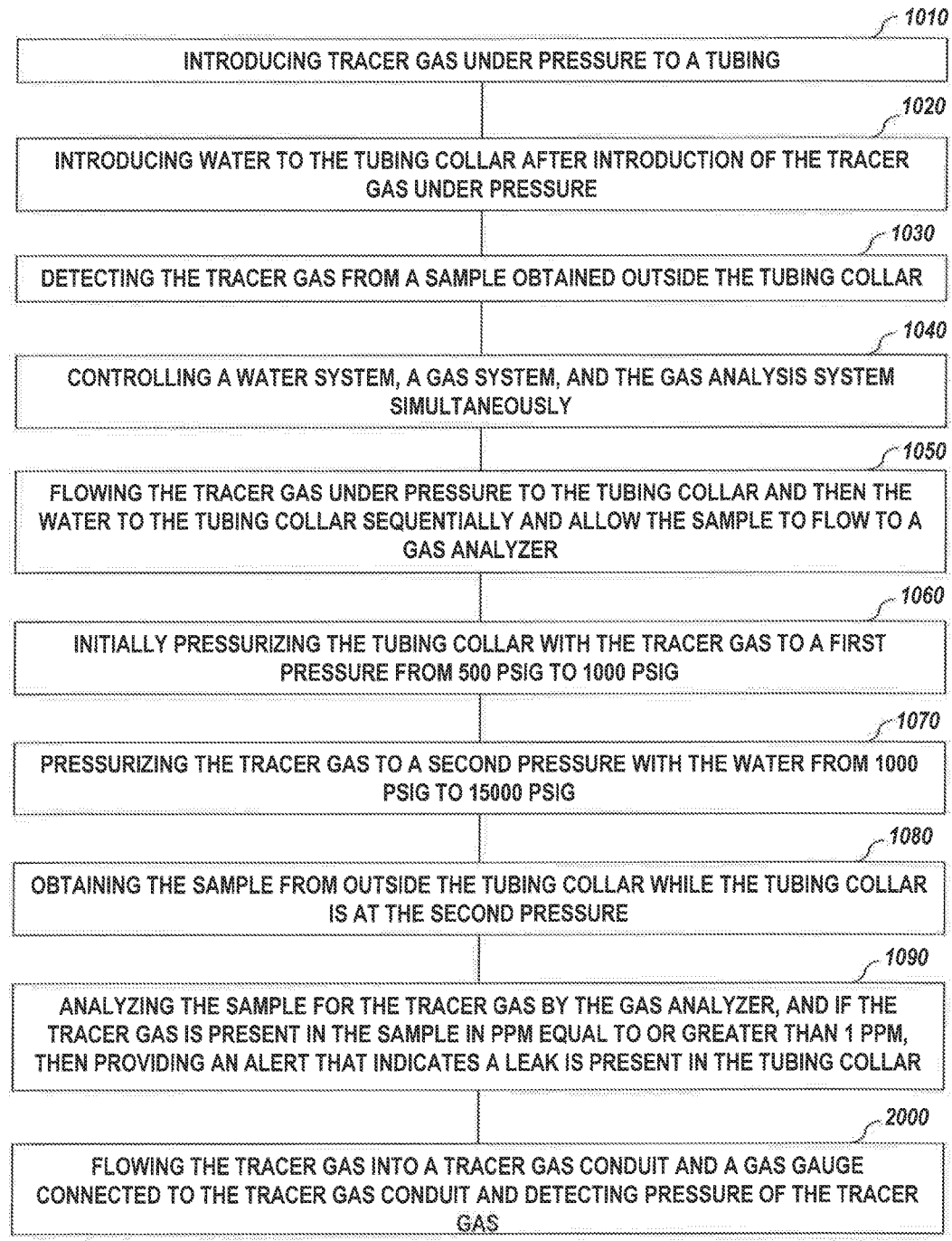

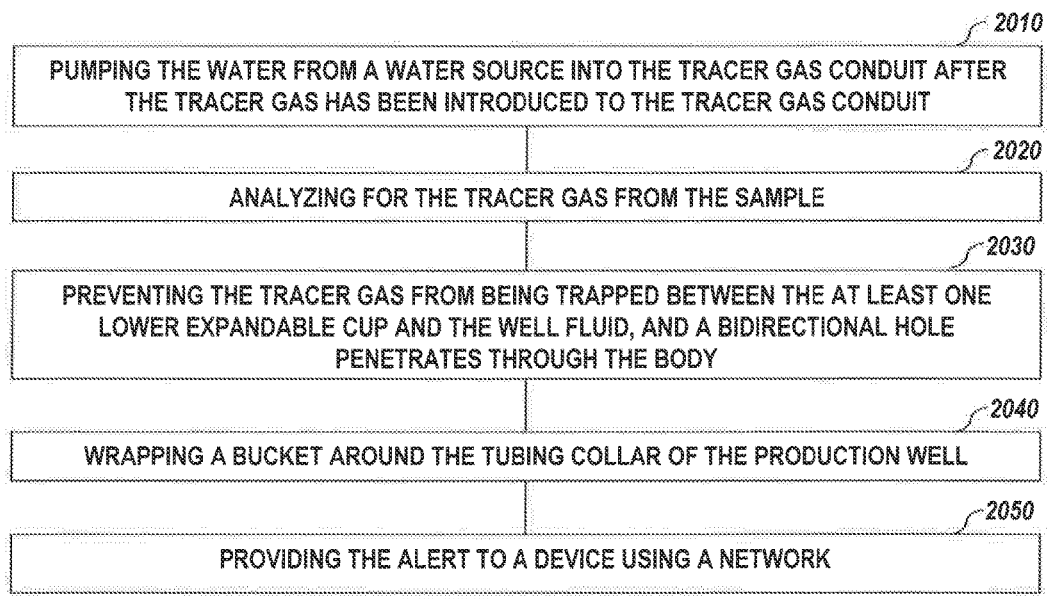

LEAK DETECTION METHOD

CROSS REFERENCE TO RELATED APPLICATION

The current application claims priority to and the benefit of U.S. Provisional Patent Application Ser. No. 62/199,557 filed on Jul. 31, 2015, entitled "LEAK DETECTION SYSTEM" and co-pending non-provisional patent application Ser. No. 15/181,879 entitled "LEAK DETECTION SYSTEM." These references are hereby incorporated in their entirety.

FIELD

The present embodiments generally relate to a leak detection method for testing a tubing collar in a wellbore of a well.

BACKGROUND

A need exists for a leak detection method that detects very small leaks in a tubing collar of a production well down to 1 ppm.

The present embodiments meet these needs.

BRIEF DESCRIPTION OF THE DRAWINGS

The detailed description will be better understood in conjunction with the accompanying drawings as follows:

FIGS. 4A and 4B are a detail of the steps for implementing the method.

Figure 1:
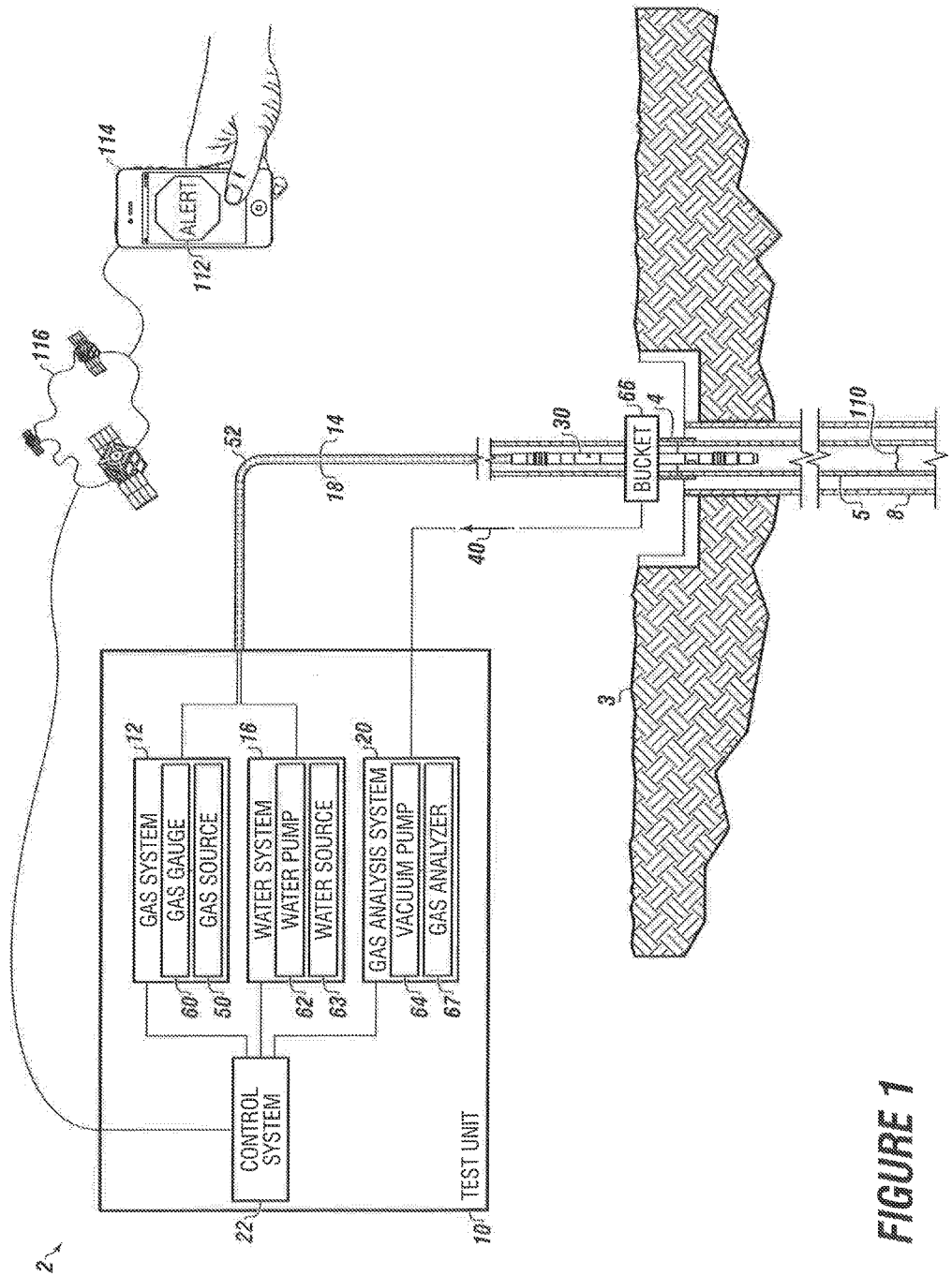
FIG. 1 depicts the leak detection system according to one or more embodiments

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments generally relate to a leak detection method. The present embodiments further relate to a leak detection method for testing a tubing collar in a wellbore of a well, wherein the wellbore tubing can contain well fluid.

The leak detection method comprises the step of introducing tracer gas under pressure to a tubing collar.

The method comprises the step of introducing water to the tubing collar after introduction of the tracer gas under pressure.

The method comprises the step of detecting the tracer gas from a sample obtained outside the tubing collar.

The method comprises the step of controlling a water system, a gas system, and the gas analysis system simultaneously The method includes flowing the tracer gas under pressure to the tubing collar and then the water to the tubing collar sequentially and allowing the sample to flow to a gas analyzer.

The method includes initially pressurizing the tubing collar with the tracer gas to a first pressure from 500 psig to 1000 psig.

The method includes pressurizing the tracer gas to a second pressure with the water from 1000 psig to 15000 psig.

The method includes obtaining the sample from outside the tubing collar while the tubing collar is at the second pressure.

The method includes analyzing the sample for the tracer gas by the gas analyzer, and if the tracer gas is present in the sample in ppm equal to or greater than 1 ppm, then providing an alert that indicates a leak is present in the tubing collar.

The embodiments offer a level of remote site personal protection, which can help ensure the health and safety of individual employees at a well site or as a group of employees at a well site against chemical hazards and environmental hazards.

The leak detection method can detect very small leaks in a production string collar, down to leaks of 1 ppm.

The leak detection method requires a very low pressure to set the expandable cups of the mandrels making the system is safer to install.

The leak detection method isolates the tracer gas between expandable cups instead of releasing the tracer gas to atmosphere.

The leak detection method avoids trapping gas between a lower portion of expandable cups on a lower mandrel and well fluid, which can prevent pressure build up, and can prevent the tubing collar testing tool from propelling out of the wellbore causing injuries and fatalities.

The leak detection method can work with most tubing strings, including production strings and drill strings in a wide variety of materials and conditions, such as steel, FIBERGLASS® or concrete lined structures.

The embodiments further relate to a leak detection method for testing a tubing collar of wellbore tubing of a well, the wellbore tubing can contain well fluid, the leak detection system can have a test unit with a control system for simultaneously controlling a gas system, a water system, a gas analysis system, and a tubing collar testing tool. The tubing collar testing tool can be initially pressurized with tracer gas from 500 psig to 1000 psig, then pressurized using water to a second pressure from 1000 psig to 15000 psig. A sample can be taken proximate to the tubing collar while the tubing collar testing tool is at the second pressure.

The sample can be analyzed for tracer gas and if tracer gas is present in the sample in ppm equal to or greater than 1 ppm, the control system can provide an alert that a leak is present in the tubing collar.

The term "message" as used herein can refer to a communication to a user of the leak detection system that equal to or greater than 1 ppm of helium or other tracer gas has been detected in the sample.

The term "sample" as used herein can be continuous sampling under vacuum flowing continuously to the gas analyzer or can be a batch system for sampling.

The term "tracer gas" as used herein can refer to inert gases, such as helium, a mixture of nitrogen and helium, or combinations thereof. In embodiments, the tracer gas can be sulfur hexafluoride.

The term "tubing collar" as used herein can refer the connection between two joints of tubing that makeup a tubing string.

The term "water" as used herein can refer to water that can be potable, with up to 10 percent particulate suspended therein.

The term "well" as used herein can refer to a hydrocarbon well, such as a production well, a disposal well, a well being drilled, a work over well, or a water well.

The term "wellbore tubing" as used herein can refer to pipe.

The term "well fluid" as used herein can refer to any fluid that is in the well, such as water, drilling mud, the like and combinations thereof.

Turning now to the Figures, FIG. 1 depicts the leak detection system according to one or more embodiments.

FIG. 1 shows a leak detection system 2, which is used in a method for testing a tubing collar 4 of wellbore tubing 5 for a well 8 extending below a surface 3.

The wellbore tubing is shown containing a well fluid 110.

The leak detection system 2 can have a test unit 10 which can be a truck.

The leak detection system 2 can include a gas system 12, which can be configured to introduce tracer gas 14 under pressure to the tubing collar 4.

The leak detection system 2 can include a water system 16, which can be configured to introduce water 18 sequentially to the tubing collar 4 after introduction of tracer gas 14 under pressure.

The leak detection system 2 can include a gas analysis system 20, which can be configured to detect tracer gas 14 from a sample 40, which can be obtained outside and proximate to the tubing collar 4.

The leak detection system 2 can include a control system 22, which can be configured to control the water system 16, the gas system 12 and the gas analysis system 20, and a tubing collar testing tool 30 simultaneously.

The tubing collar testing tool 30 can be fluid communication with the water system 16 and the gas system 12.

The tubing collar testing tool 30 can be inserted into a tracer gas conduit 52, which can flow tracer gas and then water under pressure to the tubing collar.

The tubing collar testing tool 30 can be configured to flow tracer gas 14 under pressure to the tubing collar 4 and then the water system 16 can flow water to the tubing collar to increase tracer gas pressure, in sequence.

The tubing collar testing tool 30 can be initially pressurized with tracer gas at a first pressure, which can range from 500 psig to 1000 psig.

The tracer gas 14 can then be pressurized to a second pressure using water 18 from the water system 16. The second pressure can range from 1000 psig to 15,000 psig.

The sample 40 can be taken from proximate to the tubing collar 4 while the tubing collar testing tool 30 maintains the tracer gas at the second pressure.

The sample 40 can be analyzed for tracer gas 14, and if tracer gas is present in the sample in ppm of equal to or greater than 1 ppm, then the control system 22 can transmit an alert 112 that a leak is present in the tubing collar 4.

The gas system 12 can have a gas source 50 with tracer gas 14, which can be in communication with the test unit 10. The tracer gas 14 can flow into the tracer gas conduit 52.

The gas system 12 can have a gas gauge 60, which can connect to the tracer gas conduit 52 and detect pressure of tracer gas 14.

The water system 16 can have a water pump 62 for pumping the water 18 from a water source 63 into the tracer gas conduit 52. The water pump can connects to the water source 63 via a water conduit.

The gas analysis system 20 can connect to a bucket 66. The gas analysis system 20 can have a vacuum pump 64 and a gas analyzer 67.

In embodiments, the bucket 66 can be positioned around or wraps around the tubing collar 4 of a drilling well, a production well, or another kind of well that requires leak testing as pipe or tubing is connected together forming a tubing string.

The control system 22 can provide the alert 112 to a device 114, such as a cellular phone, a smart phone, a tablet, a computer, a laptop, or similar device capable of bidirectional communication using a network 116.

Figure 2:
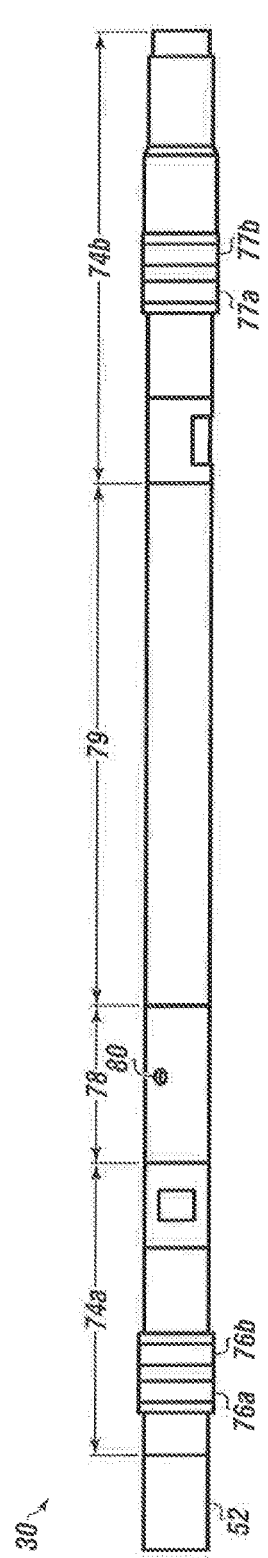
FIG. 2 is a side perspective view of the tubing collar testing tool according to one or more embodiments.

FIG. 2 is a side perspective view of the tubing collar testing tool according to one or more embodiments.

The tubing collar testing tool can have an upper mandrel 74a and a lower mandrel 74b, wherein each mandrel can have at least one expandable cup.

In this embodiment, the upper mandrel 74a is shown having upper expandable cups 76a and 76b and the lower mandrel 74b is shown having lower expandable cups 77a and 77b.

The tubing collar testing tool 30 can have a body 78, which can engage the upper mandrel 74a on one end and can engage a body extension 79 on an end opposite the upper mandrel 74a.

In embodiments, the body 78 and the body extension 79 can be between the upper mandrel 74a and the lower mandrel 74b.

The body 78 can have a bidirectional hole 80 penetrating through the body 78, wherein the bidirectional hole can be used as an entrance and exit for the tracer gas.

The upper mandrel 74a can engage the tracer gas conduit 52.

In embodiments, the tubing collar testing tool is configured so that no tracer gas is trapped between the expandable cups and the well fluid.

Figure 3:
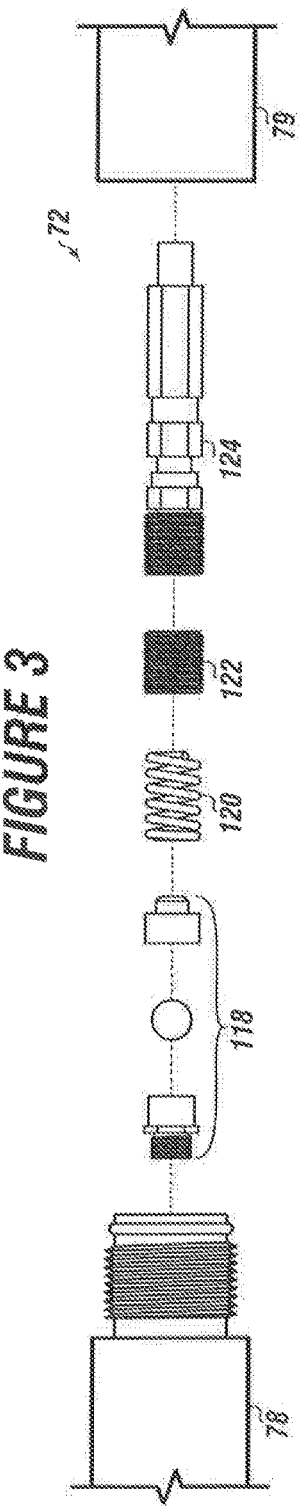
FIG. 3 is an exploded view of the adjustable pressure control valve according to one or more embodiments.

FIG. 3 is an exploded view of the adjustable pressure control valve according to one or more embodiments.

An adjustable pressure control valve 72 can be configured to control flow of tracer gas through the body 78 of the tubing collar testing tool.

In embodiments, the adjustable pressure control valve 72 can be mounted inside of the body 78 and can extend into the body extension 79. In embodiments, the adjustable pressure control valve can be mounted between the body 78 and the body extension 79.

The adjustable pressure control valve can have a ball and seat assembly, which can be connected to a high pressure spring 120. The high pressure spring 120 can engage a pressure adjustable screw 122 and a check valve with cap and screw 124.

FIGS. 4A and 4B depict the method 1000 for leak detection for testing a tubing collar of wellbore tubing of a well according to one or more embodiments.

The method can include introducing tracer gas under pressure to a tubing collar, as shown in box 1010.

The method can include introducing water to the tubing collar after introduction of the tracer gas under pressure, as shown in box 1020.

The method can include detecting the tracer gas from a sample obtained outside the tubing collar, as shown in box 1030.

The method can include controlling a water system, a gas system, and the gas analysis system simultaneously, as shown in box 1040.

The method can include flowing the tracer gas under pressure to the tubing collar and then the water to the tubing collar sequentially and allow the sample to flow to a gas analyzer, as shown in box 1050.

The method can include initially pressurizing the tubing collar with the tracer gas to a first pressure from 500 psig to 1000 psig, as shown in box 1060.

The method can include pressurizing the tracer gas to a second pressure with the water from 1000 psig to 15000 psig, as shown in box 1070.

The method can include obtaining the sample from outside the tubing collar while the tubing collar is at the second pressure, as shown in box 1080.

The method can include analyzing the sample for the tracer gas by the gas analyzer, and if the tracer gas is present in the sample in ppm equal to or greater than 1 ppm, then providing an alert that indicates a leak is present in the tubing collar, as shown in box 1090.

In embodiments, the method can include flowing the tracer gas into a tracer gas conduit and a gas gauge connected to the tracer gas conduit and detecting pressure of the tracer gas, as shown in box 2000.

In embodiments, the method can include pumping the water from a water source into the tracer gas conduit after the tracer gas has been introduced to the tracer gas conduit, as shown in box 2010.

In embodiments, the method can include analyzing for the tracer gas from the sample, as shown in box 2020.

In embodiments, the method can include preventing the tracer gas from being trapped between the at least one lower expandable cup and the well fluid, and a bidirectional hole penetrates through the body, as shown in box 2030.

The method can include wrapping a bucket around the tubing collar of the production well, as shown in box 2040.

The method can include providing the alert to a device using a network, as shown in box 2050.

In embodiments, the leak detection system can be mounted on a portable and movable vehicle, such as a truck. In embodiments, the test unit can be mounted a vehicle or to a skid. In embodiments, the leak detection system can use the vehicle, a truck or a trailer.

In embodiments, the control system can include at least one of: a joystick, a plurality of switches, a remote control and combinations thereof, for operating the water system, the gas system, and the gas analysis system.

As an example of use of the system, Joseph is charged with determining if a tubing collar for a production well TJT 2015 in West Texas is leaking.

Joseph gets his test unit, which is a truck.

The leak detection system includes a tubing collar testing tool to be suspended in the tubing string of TJT 2015 enabling Joseph to control flow of tracer gas under pressure into the tubing collar testing tool.

If needed, Joseph can use a cable or winch to connect to the tubing collar testing tool, to lift the tubing collar testing tool and place the tubing collar testing tool inside of the tubing string of production well TJT 2015.

Joseph then positions the tubing collar testing tool inside of and proximate to the tubing collar of production well TJT 2015.

The leak detection system can include the tubing collar testing tool to be suspended in the tubing string of TJT 2015 enabling Joseph to control flow of tracer gas under pressure.

The tubing collar testing tool is initially pressurized with tracer gas to 999 psig.

Joseph's rig hand Jim, places a bucket around the tubing collar of production well TJT 2015.

While Jim is holding the bucket, Joseph operates the gas system mounted to the truck.

The gas system can inject tracer gas, in this case, helium gas, under pressure to the tubing collar of the tubing string of production well TJT 2015.

The helium gas is pre-pressured to 999 psi in its cylinders.

The water system is mounted to the truck, Joseph operates the water system to flow water from the water source, such as a water tank mounted on the truck into the tubing collar of production well TJT 2015.

The water is only injected after the helium gas at the initial pressure of 999 psi is injected into the tubing collar.

The water system includes the water pump for pumping the water though the same hose that initially injected the helium at 999 psi.

The truck provides a power source which is hydraulic, to power the water pump and to inject the helium gas at its initial pressure of 999 psi.

The helium gas is pre-pressurized in cylinders stored either on the truck or on a skid mounted unit next to the truck or on another truck parked next to Joseph's test unit.

Also on Joseph's test unit is a test system for testing samples from the tubing collar. The samples can contain trace elements of the injected helium.

Joseph uses the gas analysis system for detecting the presence of tracer gas and the helium gas, using samples which can be samples of air from the bucket proximate to and external to the tubing collar.

The gas analyzer used in the method is for the helium is connected to a discharge side of a vacuum pump. The bucket is connected to the vacuum pump. The bucket is positioned around the tubing collar. The bucket collects air samples that are tested by the gas analyzer. Air samples can be continuously obtained and tested with this system.

Joseph then pressurizes the tracer gas and the helium, to a second pressure using the water, wherein the second pressure of the tracer gas is raised to 6501 psig using the water.

A sample is taken from a zone proximate to the tubing collar while the tubing collar testing tool is at the second pressure.

Joseph views the gas analyzer of the test system to see if any helium is detected by the gas analyzer.

If helium tracer gas is present in the sample in ppm equal to or greater than 1 ppm then the control system mounted to the truck provides a message to a user that a leak is present, such as with an audible alarm or a flashing light mounted to the truck.

The control system on the truck allows Joseph to control not only the water system, but also the gas system and the gas analysis system simultaneously from a single position.

In embodiments, the control system can be one simple joystick connected to all three systems.

Pressure is released from the tubing collar test tool after analysis.

Each time, another tubing collar is tested, the tubing collar test tool is removed from the tubing string to allow new joints to be installed the tool is reinstalled on the new pipe and then tested.

The leak detection method is repeated with each joint of pipe added to the tubing string.

This leak detection analysis method can be performed as many times a day ensuring a safe and production environment.

While these embodiments have been described with emphasis on the embodiments, it should be understood that within the scope of the appended claims, the embodiments might be practiced other than as specifically described herein.

What is claimed is:

1. A method for leak detection for testing a tubing collar of wellbore tubing of a well, leak detection method comprising the steps of:
   a. introducing tracer gas under pressure to a tubing collar;
   b. introducing water to the tubing collar after introduction of the tracer gas under pressure;
   c. detecting the tracer gas from a sample obtained outside the tubing collar;
   d. controlling a water system, a gas system, and the gas analysis system simultaneously;
   e. flowing the tracer gas under pressure to the tubing collar and then the water to the tubing collar sequentially and allowing the sample to flow to a gas analyzer;
   f. initially pressurizing the tubing collar with the tracer gas to a first pressure from 500 psig to 1000 psig;
   g. pressurizing the tracer gas to a second pressure with the water from 1000 psig to 15000 psig;
   h. obtaining the sample from outside the tubing collar while the tubing collar is at the second pressure; and
   i. analyzing the sample for the tracer gas by the gas analyzer, and if the tracer gas is present in the sample in ppm equal to or greater than 1 ppm, then providing an alert that indicates a leak is present in the tubing collar.

2. The method of claim 1, wherein the method comprises flowing the tracer gas into a tracer gas conduit and a gas gauge connected to the tracer gas conduit and detecting pressure of the tracer gas.

3. The method of claim 1, wherein the method comprises pumping the water from a water source into the tracer gas conduit after the tracer gas has been introduced to the tracer gas conduit.

4. The method of claim 1, wherein the method comprises analyzing for the tracer gas from the sample.

5. The method of claim 1, wherein the tubing collar comprises: a body, an adjustable pressure control valve in the body, an upper mandrel connected to one end of the body, a body extension connected to the body opposite the upper mandrel, at least one upper expandable cup on the upper mandrel, a lower mandrel connected to the body extension, at least one lower expandable cup on the lower mandrel.

6. The method of claim 5, wherein the method comprises preventing the tracer gas from being trapped between the at least one lower expandable cup and the well fluid, and a bidirectional hole penetrates through the body.

7. The method of claim 1, wherein the method comprises wrapping a bucket around the tubing collar of the production well.

8. The method of claim 1, wherein the method comprises providing the alert to a device using a network.

9. The method of claim 5, wherein the adjustable pressure control valve comprises:
   a. a ball and seat assembly connected to a high pressure spring;
   b. a pressure adjustment screw connected to the high pressure spring; and
   c. a check valve with cap and screw connected to the pressure adjustment screw.

* * * * *